United States Patent [19]
Kobayashi et al.

[11] 3,951,518
[45] Apr. 20, 1976

[54] PROJECTOR AND PROJECTION SCREEN ASSEMBLY

[75] Inventors: Kazuki Kobayashi, Hachioji; Kikuo Takita, Tokyo, both of Japan

[73] Assignee: Ricoh Co., Ltd., Tokyo, Japan

[22] Filed: Sept. 30, 1974

[21] Appl. No.: 510,819

[30] Foreign Application Priority Data
Nov. 8, 1973   Japan.................... 48-128593[U]

[52] U.S. Cl.............................. 350/117; 352/104; 353/72; 353/77
[51] Int. Cl.².................. G03B 21/56; G03B 21/10; G03B 21/22; G03B 21/28
[58] Field of Search............ 350/117; 352/104, 242; 353/71, 72, 17, 74, 77

[56] References Cited
UNITED STATES PATENTS

| | | | |
|---|---|---|---|
| 3,352,203 | 11/1967 | Barke et al. | 352/104 X |
| 3,375,054 | 3/1968 | Hughes | 352/242 X |
| 3,522,982 | 8/1970 | Hughes | 352/104 |
| 3,650,614 | 3/1972 | Shimoda et al. | 353/72 |
| 3,695,746 | 10/1972 | Youngblood | 352/104 |
| 3,746,437 | 7/1973 | Pammer et al. | 352/104 |
| 3,807,848 | 4/1974 | Shoemaker | 353/72 |

FOREIGN PATENTS OR APPLICATIONS

| | | | |
|---|---|---|---|
| 1,186,246 | 4/1970 | United Kingdom | 352/104 |

*Primary Examiner*—Richard A. Wintercorn
*Attorney, Agent, or Firm*—Frank J. Jordan

[57] ABSTRACT

A box-shaped projection screen unit is attachable to an optical projector to constitute a cover therefor. The screen unit comprises a translucent screen mounted in an opening formed through the side of the box opposite an open side of the box which mates with the projector. A rectangular plate hinged to a vertical edge of the box has an internal reflecting surface facing the screen, and is swingable from a storage position covering the screen outward to a projection position in which the plate forms an angle with the screen. A triangular cover plate is hinged to the top edge of the box, and is swingable from a storage position between the rectangular plate and the screen outward to a horizontal position in which another edge of the triangular plate engages with the rectangular plate to hold the same in the projection position and prevent incident light from above from reaching the screen. In operation, an image from the projector is reflected from the reflecting surface of the rectangular plate and focussed onto the screen, and the image is viewed through the box from the open side thereof.

6 Claims, 3 Drawing Figures

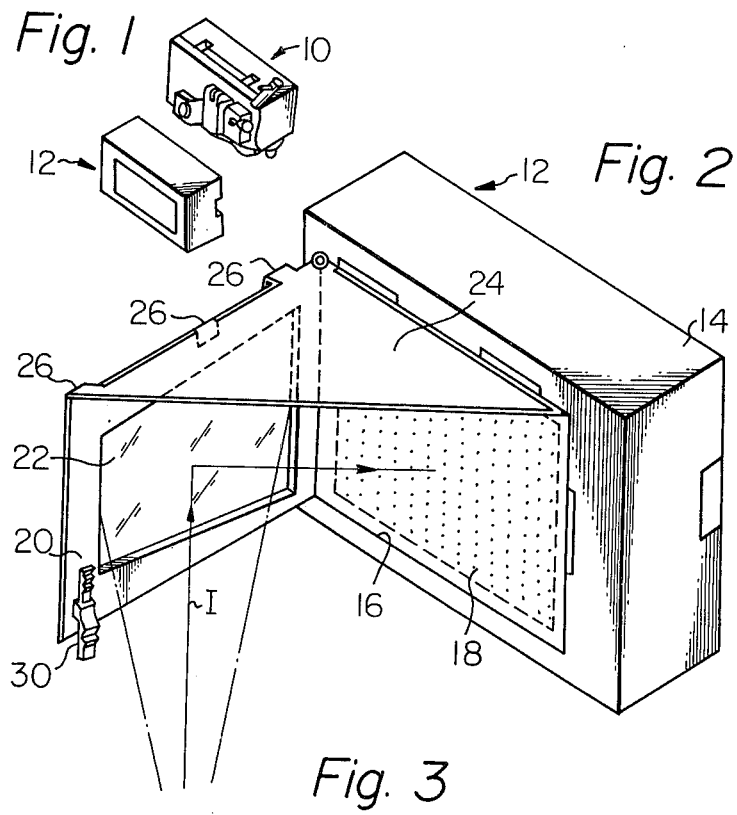
Fig. 1
Fig. 2
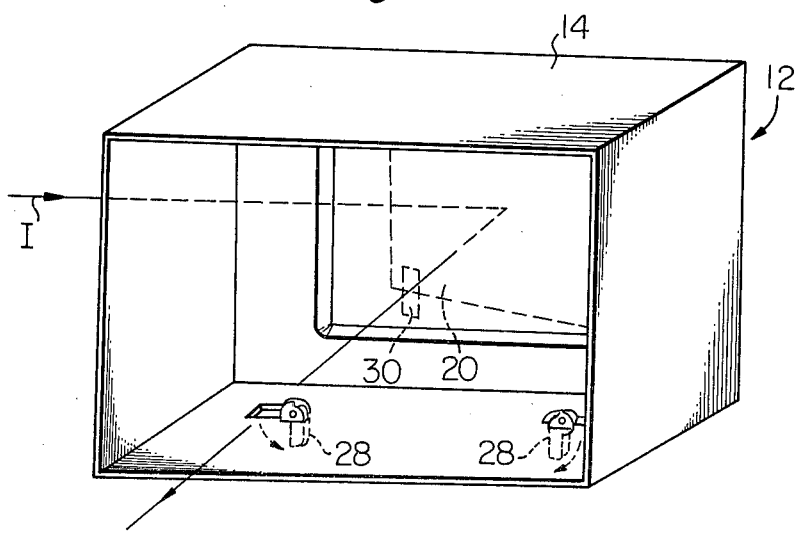
Fig. 3

PROJECTOR AND PROJECTION SCREEN ASSEMBLY

The present invention relates to an optical projection system and also to a projection screen unit constituting part of an optical projection system attachable to a projector to constitute a cover therefor.

It is known in the prior art to provide an optical projection system comprising a projector, a mirror and a translucent screen. An image from the projector is reflected from the mirror, focussed on the screen and viewed from the reverse side of the screen. A projection screen unit comprising such a translucent screen and a mirror is known in which the mirror is hinged to the screen and foldable to a storage position covering the screen. This unit is, however, separate from the projector, and must be stored and transported separately. Problems also arise in this system in aligning the vertical axes of the projector and the screen unit and in preventing incident light from the surroundings from reaching the screen and reducing the image contrast. These problems are solved in another prior art system in which the projector is integral with the screen unit. In such a system, however, due to the distance required between the lens of the projector and the screen and other design factors, the combined projector and screen unit must be necessarily bulky and heavy.

It is therefore an important ojbect of the present invention to provide a novel optical projection system comprising a projector and a detachable projection screen unit which can be compactly attached to the projector to constitute a storage cover therefor.

It is another important object of the present invention to provide a novel projection screen unit which may be compactly attached to a known optical projector to constitute a storage cover therefor.

The above and other objects, features and advantages of the present invention will become clear from the following detailed description taken with the accompanying drawings, in which:

FIG. 1 is a perspective view of an optical projection system embodying the present invention;

FIG. 2 is a perspective view of a projection screen unit shown in FIG. 1; and

FIG. 3 is a perspective view from another angle of the projection screen unit shown in FIG. 2.

Referring now to FIG. 1, an optical projection system according to the present invention comprises an optical projector 10 and a projection screen unit 12 which is attachable to the projector 10 to constitute a storage cover therefor. The projector 10 may be a movie, slide or opaque projector or the like.

The projection screen unit 12 is shown in detail in FIGS. 2 and 3 and comprises a generally box-shaped housing 14. The housing 14 has five closed sides and an open side. The open side faces out of the drawing in FIG. 3 and is adapted to mate with the projector 10. An opening 16 is formed through the side of the housing 14 opposite to the open side thereof, and a translucent projection screen 18 is mounted in the opening 16. The screen 18 may be formed of ground glass or a translucent resin or the like. The means for fastening the housing 14 to the projector 10 for storage may be any known in the art, and are not shown.

A generally rectangular plate 20 is hinged to the outer surface of the side of the housing 14 having the opening 16 formed therethrough. A vertical edge of the plate 20 is hinged to the housing 14 near a vertical edge thereof, and is swingable from a folded storage position (not shown) parallel to and covering the screen 18 to a projection position as shown in FIG. 2 in which the plate 20 forms a predetermined angle with the screen 18. The inner surface of the plate 20 (the surface facing the screen 18) is optically reflective, and may be in the form of a mirror 22 mounted on the plate 20.

An edge of a triangular cover plate 24 is hinged to the same surface of the housing 14 as the plate 20 but along the top edge thereof. The triangular plate 24 is swingable from a folded storage position (not shown) between the plate 20 and the screen 18 to the horizontal position shown in FIG. 2. Another edge of the plate 24 is formed with tabs 26 which engage with the upper edge of the plate 20 to hole the plate 20 at the desired unfolded position for projection. The plate 24 covers the top of the area between the plate 20 and screen 18 to prevent overhead incident light from reaching the screen 18. The plate 24 may be rectangular if desired, to cover twice the area as the triangular plate 24 shown.

The projection screen unit 12 further comprises two retractable legs 28 provided at the bottom surface of the housing 14 and a latch 30 provided near the bottom edge of the plate 20 which serves as a third leg. The latch 30 is used to hold the plate 20 in the folded storage position covering the screen 18 when the projection system is not being used.

To store the projection system, the plate 24 is swung slightly upward so that the tabs 26 disengage from the upper edge of the plate 20. The plate 20 is then swung slightly outward so that the plate 24 will clear the plate 20 when the plate 24 is swung downward. The plate 24 is then swung downward or folded so that it is parallel to the screen 18. The plate 20 is then folded or swung inward to cover and be substantially parallel to the plate 24 and screen 18. The plates 20 and 24 are held in the storage position by engagement of the latch 30 with the housing 14. The legs 28 are retracted into the housing 14 and the housing 14 is attached to the projector 10 to constitute a cover therefor.

To use the projection system, the housing 14 is removed from the projector 10, and the legs 28 are extended as shown by arrows in FIG. 3. The latch 30 is then unlatched and moved into the position shown in FIG. 2 to constitute the third leg. The plate 20 is then swung outward slightly past the position shown in FIG. 2 so that the plate 24 can clear the plate 20, and then the plate 24 is swung upwards slightly past the position shown in FIG. 2. The plates 20 and 24 are then swung inward to the positions shown in FIG. 2 so that the mirror 22 forms the predetermined projection angle with the screen 18 and the tabs 26 of the plate 24 engage with the upper edge of the plate 20 to hold the plate 20 in the projection position. The projector 10 and projection screen unit 12 are then relatively oriented so that an image projected by the projector 10 is reflected from the mirror 22 and focussed on the screen 18. This can be seen in FIGS. 2 and 3 with reference to a ray path designated by the character I, which represents the central axis of the image projected by the projector 10. The image on the screen 18 is viewed from the opposite side of the screen 18 through the housing 14 from the open side thereof.

In addition to the advantages of compactness and utility provided by the present invention, the projection screen unit 12 features high image brightness and contrast compared to prior art projection screen units comprising mirrors and translucent plates. This is because the image on the screen 18 is viewed through the box-shaped housing 14, the closed sides of the housing 14 preventing incident light from the surroundings from reaching the screen 18 to reduce the image contrast. The plates 20 and 24 serve the same function on the projector side of the projection screen unit 12. A projection system embodying the present invention can therefore be used even in a light room.

Also, due to the fact that the projector 10 and projection screen unit 12 are constructed in the form of an integrated system, the legs 28 and latch 30 provide perfect and automatic alignment of the vertical optical axes of the projector 10 and projection screen unit 12 when they are placed on the same horizontal surface.

What is claimed is:

1. A projection screen unit adapted to be attached to a projector to constitute a cover for the projector, the projection screen unit comprising:
   a generally box-shaped housing having one open side and an opening formed through the opposite side, the open side being adapted to mate with the projector;
   a translucent screen mounted in the opening;
   a plate hinged at one edge thereof to the housing along one vertically oriented edge of the outer surface of the side of the housing having the opening formed therethrough, the plate having a reflecting surface formed on the side thereof facing the translucent screen, the plate being swingable from a storage position covering the translucent screen outwardly to a projection position;
   means for holding the plate in the selected one of the storage and projection positions; and
   legs attached to the lower portion of the unit to support the same, two legs being attached to the lower surface of the housing and one leg being attached to the lower portion of the plate, the part of the means for holding the plate operative to hold the plate in the storage position comprising a latch, the latch also serving as the leg attached to the lower portion of the plate.

2. A projection screen unit according to claim 1, further comprising means for covering the top of the space defined between the translucent screen and the plate when the plate is in the projection position.

3. A projection screen unit according to claim 2, in which the means for covering the top of the space comprises a cover plate hinged at one edge thereof to the housing along the upper edge of the outer surface of the side of the housing having the opening formed therethrough, the cover plate being swingable from a storage position covering the translucent screen outwardly to a substantially horizontal projection position in which another edge of the cover plate engages with the upper edge of the plate.

4. A projection screen unit according to claim 3, in which the cover plate further constitutes the part of the means for holding the plate operative to hold the plate in the projection position.

5. A projection screen unit according to claim 1, in which the two legs attached to the lower surface of the housing are retractable into the housing.

6. An optical projection system, comprising:
   an optical projector; and
   a projection screen unit detachably mountable on the projector to constitute a cover therefor, the projection screen unit including:
   a generally box-shaped housing having one open side and an opening formed through the opposite side, the open side being adapted to mate with the projector;
   a translucent screen mounted in the opening;
   a plate hinged at one edge thereof to the housing along one vertically oriented edge of the outer surface of the side of the housing having the opening formed therethrough, the plate having a reflecting surface formed on the side thereof facing the translucent screen, the plate being swingable from a storage position covering the translucent screen outwardly to a projection position;
   means for holding the plate in the selected one of the storage and projection positions; and
   legs attached to the lower portion of the unit to support the same, two legs being attached to the lower surface of the housing and one leg being attached to the lower portion of the plate, the part of the means for holding the plate operative to hold the plate in the storage position comprising a latch, the latch also serving as the leg attached to the lower portion of the plate.

* * * * *